US012562577B2

(12) United States Patent
Woods

(10) Patent No.: US 12,562,577 B2
(45) Date of Patent: Feb. 24, 2026

(54) SYSTEMS, METHODS, AND APPARATUS FOR MANAGEMENT OF ELECTRICAL ENERGY TRANSFER OR DISTRIBUTION AMONGST A PLURALITY OF DEVICES

(71) Applicant: Toyota Motor Engineering & Manufacturing North America, Inc., Plano, TX (US)

(72) Inventor: Brian Woods, Brighton, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA (JP)

( * ) Notice: Subject to any disclaimer, the term of this patent is extended or adjusted under 35 U.S.C. 154(b) by 597 days.

(21) Appl. No.: 17/962,339

(22) Filed: Oct. 7, 2022

(65) Prior Publication Data

US 2024/0120743 A1 Apr. 11, 2024

(51) Int. Cl.
*H02J 3/38* (2006.01)
*H02J 3/14* (2006.01)

(52) U.S. Cl.
CPC ................ *H02J 3/381* (2013.01); *H02J 3/14* (2013.01); *H02J 2310/50* (2020.01)

(58) Field of Classification Search
CPC .......... H02J 3/381; H02J 3/14; H02J 2310/50
See application file for complete search history.

(56) References Cited

U.S. PATENT DOCUMENTS

| | | | | |
|---|---|---|---|---|
| 2008/0281473 A1* | 11/2008 | Pitt | ........................ | G06Q 50/06 |
| | | | | 705/412 |
| 2015/0066231 A1* | 3/2015 | Clifton | ................ | H04L 12/2803 |
| | | | | 307/46 |
| 2019/0221363 A1* | 7/2019 | Choe | ........................ | H02J 50/70 |
| 2019/0315246 A1* | 10/2019 | Li | ............................ | B60L 53/68 |
| 2020/0023747 A1* | 1/2020 | Logvinov | .............. | B60L 53/63 |
| 2021/0061116 A1* | 3/2021 | Lin | ......................... | B60L 53/37 |
| 2021/0203177 A1* | 7/2021 | Peng | ....................... | B60L 53/63 |
| 2023/0182580 A1* | 6/2023 | Cronin | .................... | H02J 7/345 |
| | | | | 307/10.1 |
| 2024/0235202 A1* | 7/2024 | Griffith | .................. | H02J 7/342 |

* cited by examiner

*Primary Examiner* — Charles Cai
(74) *Attorney, Agent, or Firm* — Snell & Wilmer LLP

(57) ABSTRACT

A system for managing transfer or distribution of energy amongst a plurality of devices. The system includes one or more connectors configured to provide one or more connections to at least one of the plurality of devices, a switching device connected to the one or more connectors and configured to open or close the one or more connections, a memory configured to store energy storage or usage data associated with the at least one of the plurality of devices, and a controller coupled to the switching device and the memory. The controller may receive first data indicative of a request to receive energy, receive second data indicative of a request to unload energy, determine, based on the energy storage or usage data, the first data, and the second data, an energy distribution schedule, and control the switching device to provide or collect energy according to the energy distribution schedule.

20 Claims, 4 Drawing Sheets

200

300

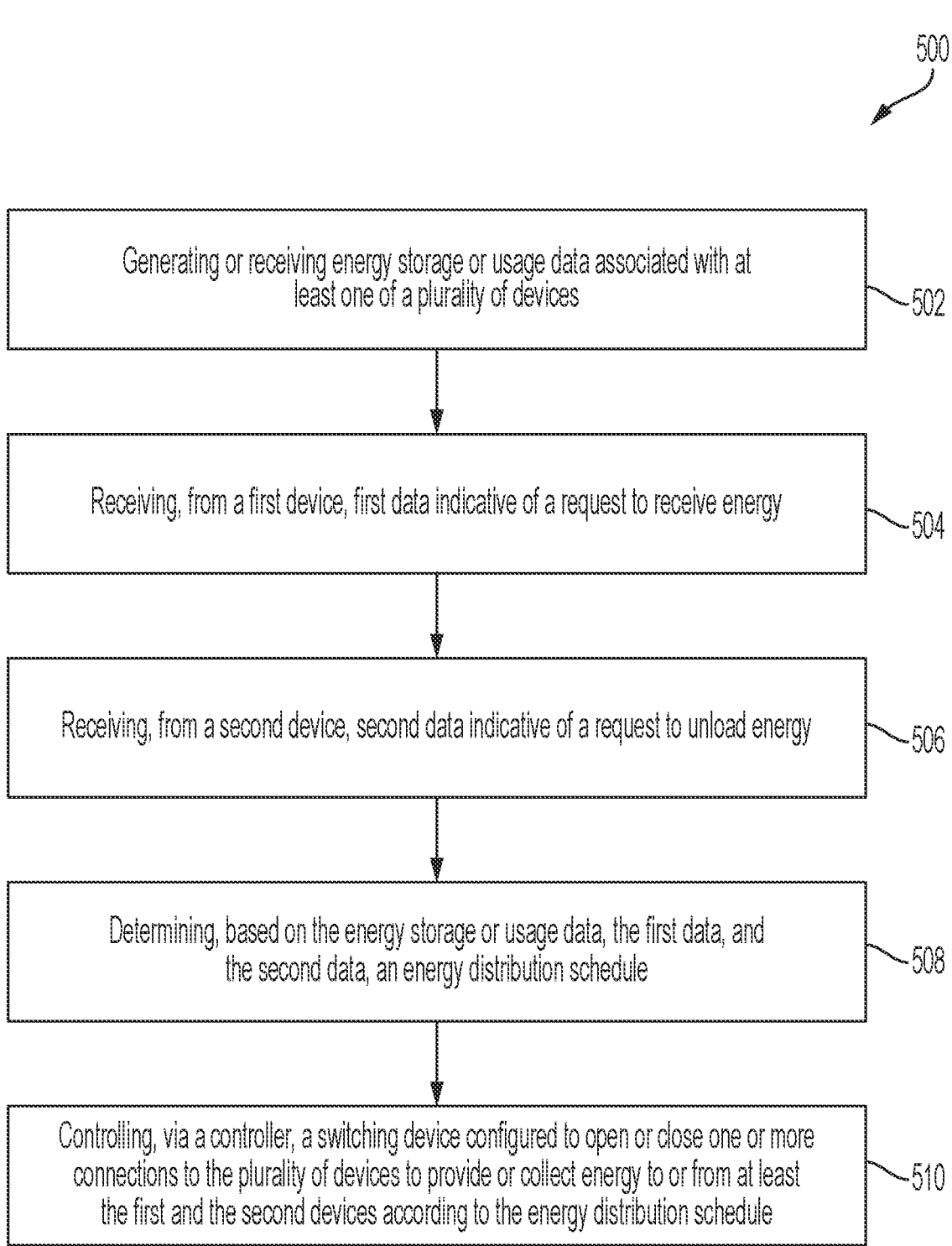

500

Generating or receiving energy storage or usage data associated with at least one of a plurality of devices — 502

Receiving, from a first device, first data indicative of a request to receive energy — 504

Receiving, from a second device, second data indicative of a request to unload energy — 506

Determining, based on the energy storage or usage data, the first data, and the second data, an energy distribution schedule — 508

Controlling, via a controller, a switching device configured to open or close one or more connections to the plurality of devices to provide or collect energy to or from at least the first and the second devices according to the energy distribution schedule — 510

FIG. 5

SYSTEMS, METHODS, AND APPARATUS FOR MANAGEMENT OF ELECTRICAL ENERGY TRANSFER OR DISTRIBUTION AMONGST A PLURALITY OF DEVICES

BACKGROUND

Field

The present disclosure is directed to systems, methods, and apparatus for managing transfer or distribution of electrical energy amongst a plurality of devices.

Description of the Related Art

Fuel-efficient vehicles (e.g., hybrid, plug-in hybrid, electric, fuel cell vehicles, etc.) continue to gain popularity over the years. Energy storage devices (e.g., batteries) of the fuel-efficient vehicles that supply power to their motors (e.g., electric motor, internal combustion engine, and/or the like) to propel the vehicles may also supply power to native components of the vehicles (e.g., air conditioner, seat heater, infotainment unit, etc.) as well as remote devices (e.g., refrigerator, ventilator, music player, speaker, outdoor light, electric stove, movie projector, smartphone, etc.). Furthermore, energy storage devices may be utilized to supply power to homes, businesses, recreational vehicles (RVs), and/or the like.

Moreover, as the use of electronic devices (e.g., appliances, communications and multimedia devices, etc.) using electrical energy increases in popularity, a demand for an availability of electrical energy at for example a home increases—especially during "peak" times of energy usage (e.g., before and after work hours). Adding additional infrastructure for, e.g., an electric grid or any permanent power source may be a costly effort (requiring a large amount of capital expenditure (CAPEX) and/or space). Furthermore, while an increasing number of facilities such as a home or a business site may have started utilizing a plurality of renewable sources of energy to provide power (e.g., a solar panel or the like), an available amount of energy (e.g., as collected through a solar panel) and a level of energy demand often may not coincide at a given time of day. For example, during daytime when the solar panel is capable of collecting energy, people may not be home to utilize the collected energy (e.g., being at school, work, or the like, or being active outdoors), creating an energy surplus. However, during evening hours when people may be back at home from being at school, work, or the like, the solar panel would not be generating any energy while an energy demand from a higher usage level of various electronic devices connected at home becomes higher, creating an energy shortage. Even the electric grid may be put to stress during these peak hours of energy use, which has led some utility companies to introduce various ways of demand response such as for example varied cost of electricity to customers at different times of day. However, people may not necessarily be able to easily adjust their energy usage schedule in response to such measures.

Due to such versatile use of electrical energy by various devices throughout a given day (with an increasing demand for availability of electrical energy in general), a more versatile and efficient way to transfer or distribute electrical energy amongst a plurality of devices is desirable, especially at various times of day when there is either a surplus or a shortage of electrical energy due to the scenarios discussed above. Hence, there is a need for advanced systems, methods, and apparatus to efficiently manage transfer or distribution of electrical energy amongst the plurality of devices.

SUMMARY

Described herein is a system for managing transfer or distribution of electrical energy amongst a plurality of devices. The system includes one or more connectors configured to provide one or more connections to at least one of the plurality of devices, a switching device connected to the one or more connectors and configured to open or close the one or more connections, a memory configured to store energy storage or usage data associated with the at least one of the plurality of devices, and a controller coupled to the switching device and the memory. The controller may be configured to receive, from a first device, first data indicative of a request to receive energy. The controller may also be configured to receive, from a second device, second data indicative of a request to unload energy. Furthermore, the controller may be configured to determine, based on the energy storage or usage data, the first data, and the second data, an energy distribution schedule. Moreover, the controller may be configured to control the switching device to provide or collect energy to or from at least the first and the second devices according to the energy distribution schedule.

Also described herein is a control apparatus for managing transfer or distribution of electrical energy amongst a plurality of devices. The control apparatus includes one or more connectors configured to provide one or more connections to at least one of the plurality of devices, a switching device connected to the one or more connectors and configured to open or close the one or more connections, a memory configured to store energy storage or usage data associated with the at least one of the plurality of devices, and a controller coupled to the switching device and the memory. The controller may be configured to receive, from a first device, first data indicative of a request to receive energy. The controller may also be configured to receive, from a second device, second data indicative of a request to unload energy. Furthermore, the controller may be configured to determine, based on the energy storage or usage data, the first data, and the second data, an energy distribution schedule. Moreover, the controller may be configured to control the switching device to provide or collect energy to or from at least the first and the second devices according to the energy distribution schedule.

Moreover, also described herein is a method for managing transfer or distribution of electrical energy amongst a plurality of devices. The method includes generating or receiving energy storage or usage data associated with at least one of the plurality of devices, receiving, from a first device, first data indicative of a request to receive energy, receiving, from a second device, second data indicative of a request to unload energy, determining, based on the energy storage or usage data, the first data, and the second data, an energy distribution schedule, and controlling, via a controller, a switching device configured to open or close one or more connections to the plurality of devices to provide or collect energy to or from at least the first and the second devices according to the energy distribution schedule.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

FIG. 5 is a flowchart illustrating a method for managing transfer or distribution of electrical energy amongst a plurality of devices according to an embodiment of the present invention.

DETAILED DESCRIPTION

The present disclosure describes systems, methods, and apparatus for managing transfer or distribution of electrical energy amongst a plurality of devices. These systems, methods, and apparatus utilize a controller with a wireless charging device (e.g., a wireless charging pad), a plurality of energy storage devices (e.g., batteries), etc. and provide many benefits and advantages including, e.g., a vehicle-to-grid (V2G) energy transfer. For example, the systems, methods, and apparatus disclosed herein may utilize a wireless charging device (e.g., a bi-directional wireless charging pad) capable of taking energy from and/or giving energy to a device capable of storing and/or utilizing electrical energy (e.g., an electric or hybrid vehicle with an integrated energy storage device such as a battery) and any other electronic devices (such as for example any household appliance, etc.) connected to the wireless charging device. Such a configuration may advantageously provide, e.g., vehicle-to-home (V2H), V2G, vehicle-to-vehicle (V2V), and/or vehicle-to-battery (V2Battery) services.

In some embodiments, the wireless charging device may provide wireless charging via electromagnetic induction or magnetic resonance. As but one example, a wireless charging device may be located on a floor of a home garage or the like and provide wireless charging/discharging of electrical energy for an electric vehicle (EV). In some embodiments, the wireless charging device may be connected to a data store capable of wirelessly retrieving data pertaining to electronic devices located on, over, or near the wireless charging device. The data store may identify and/or store information related to a type of device, a state of charge (SOC), a number, range, and/or frequency of times related to device usage (e.g., based on how often a device is charged), and/or other pertinent information and advantageously utilize this information (in conjunction with any other information such as an energy pricing schedule from a utility company) to generate a schedule for transfer or distribution of electric energy amongst a plurality of devices.

In addition, the systems, methods, and apparatus disclosed herein may include and/or utilize a bi-directional EV charge controller, auto transfer switching (ATS) for V2H, V2G, grid-to-vehicle (G2V), grid-to-battery (G2Battery), etc. Furthermore, the systems, methods, and apparatus disclosed herein may also include and/or utilize a direct current (DC) bus, DC-DC converter, voltage regulator, a bi-directional alternating current (AC)/DC converter, inverter, pulse width modulation (PWM) controller and/or auto-transformer, as well as an EV, mobility equipment or tool, and/or other wireless coupling devices (including a pad or a coil).

Figure 1:
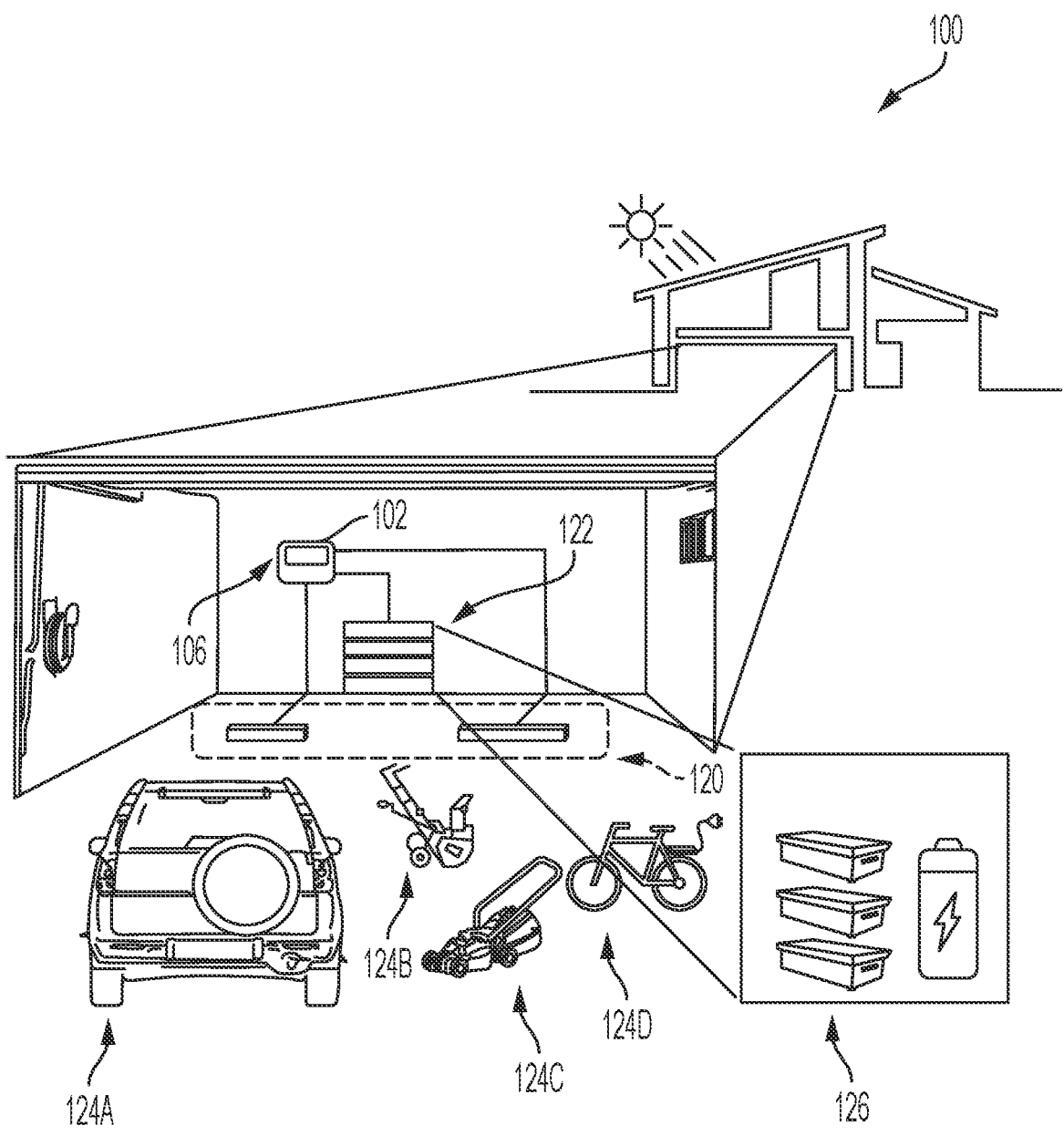
FIG. 1 is an illustration of an example building including a system for managing transfer or distribution of electrical energy amongst a plurality of devices according to an embodiment of the present invention.

Now turning to FIG. 1, an example illustration of a building 100 including a system for managing transfer or distribution of electrical energy amongst a plurality of devices is shown. The building 100 may include a controller 102, a user interface 106, one or more wireless charging devices 120, one or more energy storage devices 122 (also may be referred to as batteries throughout the present disclosure), a plurality of electrical load devices (also may be referred to as "loads" throughout the present disclosure including a vehicle 124A, a snow blower 124B, a lawn mower 124C, and an electric bicycle 124D (which may be collectively referred to as loads 124). While only four (4) loads 124A-D are shown, it would be appreciated by one of ordinary skill in the art that any number and type of devices (loads 124) may be used with the system for managing transfer or distribution of electrical energy as described herein, as long as the devices can use and/or store energy via, e.g., a battery. While not explicitly shown, the building 100 may also include connections to one or more renewable energy sources (e.g., a solar panel, a windmill, a wind turbine, etc.), an electric grid, a wired charging device (i.e., where a cable or a wire may be used to connect to the charging device and to receive/provide electrical energy from/to a connected device. In some embodiments, the building 100 may be a residential home or a commercial building (e.g., a business site), for example, with a garage or room including the components listed above and as shown in FIG. 1.

The controller 102 may include a control software, hardware, or the like which is communicatively coupled to the user interface 106, the one or more wireless charging devices 120, the one or more energy storage devices 122, and the loads 124 and configured to control one or more operations of these connected components including the energy transfer or distribution amongst the loads 124, for example, by collecting and/or storing energy via the wireless charging devices 120 and/or the energy storage devices 122.

The user interface 106 may include an input device and/or an output device. The input device may include an interface for a user to configure one or more parameters related to, e.g., the energy transfer or distribution among the plurality of loads 124 as described further herein. The output device may include another interface (which may be the same as or different from the input interface) for a user to, e.g., access or monitor various types of information related to the energy transfer or distribution (e.g., its status) as described further herein.

The wireless charging devices 120 may provide energy charging/discharging capabilities as known in the relevant art by, e.g., utilizing a charging/discharging mechanism (e.g., utilizing electromagnetic induction or magnetic resonance) based on, e.g., a control by the controller 102. In some embodiments, the wireless charging devices 120 may be a plurality of individual charging pads. In some embodiments, the wireless charging devices 120 may be a single large mat of charging device.

The energy storage devices 122 may function as an additional energy source or temporary energy storage. In some embodiments, the energy storage devices 122 may be rechargeable batteries such as a lithium-ion battery. The energy storage devices 122 may be removable and/or stackable and enable charging/discharging of energy during, e.g., peak or off-peak hours. For example, as shown, the energy storage devices 122 may be housed in corresponding receptacles 126 to which the energy storage devices 122 can be connected (e.g., linked via connector). In some embodiments, the receptacles 126 may include necessary ports, wiring, and/or connections for enabling connections, e.g., between each one and another one of the energy storage devices 122, and the energy storage devices 122 and/or the receptacles 126 may be easily removable (i.e., to be detached from other ones of the energy storage devices 122 and the building 100) without interrupting any functionality of various components of the building 100 or the remaining energy storage devices 122 or any complicated disconnection and/or re-wiring of the remaining energy storage devices 122.

Moreover, the energy storage devices 122 may be used for powering the loads 124 and providing additional electricity back to the electric grid during peak energy usage hours. In some embodiments, as but one example scenario, a device (e.g., the vehicle 124A) may be charged with electrical energy, storing more than enough energy for performing its intended functions on a given day. Then, at the end of its usage for the day (e.g., when a user drives or rides the vehicle 124A home), there may be excess energy which would otherwise not be used for anything else that day. Depending on any planned further usage or lack thereof, the excess energy of the vehicle 124A may otherwise be "wasted" if not used for any other purpose while the vehicle 124A is parked at home (e.g., the building 100). Thus, the vehicle 124A may be positioned over the wireless charging device 120 so as to allow, e.g., electromagnetic coupling between the vehicle 124A and the wireless charging device 120 to enable wireless discharge of the excess energy as described herein. The excess energy collected from the vehicle 124A may be utilized to charge other loads 124 including for example one or more appliances at home (e.g., the building 100) or be arbitraged back to the electric grid, which would allow the excess energy from the vehicle 124A to be utilized by the electric grid to service, e.g., other residential customers during peak energy usage hours. For example, there may be an energy shortage during morning and evening/night hours of day (peak energy usage hours), while there may be an energy surplus during daytime hours (off-peak energy usage hours). Thus, the excess energy made available, e.g., during the evening/night hours may offset some of the burden on the electric grid in providing a sufficient amount of energy to its customers during the evening/night hours (i.e., when there is an energy shortage). Further, in some embodiments, the energy storage devices 122 may be utilized individually (i.e., detached from the building 100, as an example) to provide power to an off-grid load (e.g., an electronic device, an appliance, a fuel-efficient vehicle) and also may be installed, e.g., within an electrically-powered vehicle (such as the vehicle 124A), a portable power station, or the like.

The loads 124 including the vehicle 124A, the snow blower 124B, the lawn mower 124C, and the electric bicycle 124D may be electrically powered to function. Some of the loads 124 may also include energy storage devices (not shown). While not shown, additional examples of the loads 124 may include or be used for musical instruments, a construction site, motorcycle, ATVs (All-Terrain Vehicles), boats, tailgating, outdoor recreational lighting, stationary systems (for security, surveillance, monitoring, emergency services, remote cabin, or the like), etc.

Figure 2:
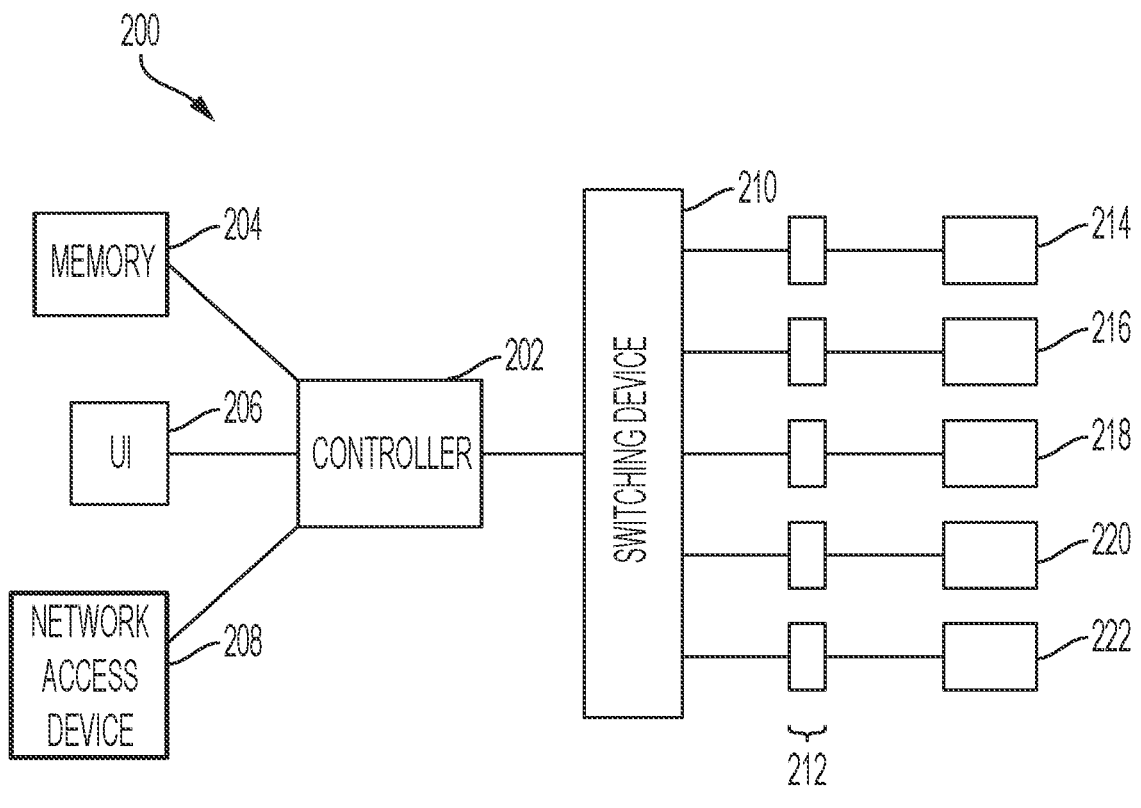
FIG. 2 is a block diagram of a system for managing transfer or distribution of electrical energy amongst a plurality of devices according to an embodiment of the present invention.

FIG. 2 is a block diagram of a system 200 (such as the system used in the building 100 described herein with reference to FIG. 1) for managing transfer or distribution of electrical energy amongst a plurality of devices. The system 200 may include a controller 202, a memory 204, a user interface 206, a network access device 208, a switching device 210, one or more connectors 212, an electric grid 214, a renewable energy source 216, a plurality of loads 218, a charging device 220, and a plurality of energy storage devices 222. The system 200 may include a subset or all of the components listed above. As described herein, the system 200 may collect any unused excess energy from various sources and automatically re-allocate the energy to various devices. As but one example, when a user drives/rides a vehicle (e.g., the vehicle 124A) home and does not plan on driving anymore, the vehicle can discharge energy through the charging device 220, the discharged energy being utilized to power other household or electronic devices such as a lawn mower. In addition or alternatively, the user may plan on driving again soon (e.g., based on the user's history of driving behavior or user input which may be received by the controller 202 via the user interface 206), and the controller 202 may control the charging device 220 (e.g., a wireless charging pad) to automatically collect energy from, e.g., the electric grid 214 and/or the energy storage device(s) 222 and charge the vehicle so it is ready to use. In various embodiments, any connection to the electric grid 214 (e.g., via the home) or other outlet may include a wired (i.e., AC) connection.

The controller 202 may be included in the system 200 and include or couple to one or more processors. These one or more processors (i.e., the controller 202 and/or any other controller or processor described herein) may be implemented as a single processor or as multiple processors. For example, the controller 202 may be a microprocessor, a data processor, a microcontroller, or other controller and may be coupled to some or all of the other components within the system 200. The functions of the controller 202 may be implemented in a single controller or in multiple controllers. For example, the controller 202 may include a user interface controller (not shown) that controls the user interface 206, a switching controller (not shown) that controls the switching device 210, or the like.

The controller 202 may receive data from one or more of the components of the system 200, make determinations based on the received data, and control the operations of the one or more of the components based on the determinations. For example, the controller 202 may receive a request to control one or more switches of the switching device 210 to be actuated to open or close one or more connections (forming open or closed circuit(s)) and control energy transfer or distribution amongst a plurality of devices including the electric grid 214, the renewable energy source 216, the loads 218, the charging device 220, and/or the energy storage devices 222. The request may be based on a user input received via the user interface 206 or the network access device 208 (e.g., a transceiver), one or more types of data captured by a sensor (e.g., an image sensor (not shown) to detect a presence of an object on, over, or near a charging device 220), or the like. The sensor may be of any type including an image sensor (e.g., a camera, a RADAR sensor, a LIDAR sensor, or the like), a weight sensor, a proximity sensor (e.g., a Near-Field Communication (NFC), Bluetooth, and/or Wi-Fi device, and/or other proximity sensors of inductive, optical, capacitive, magnetic, infrared, and ultrasonic types), etc. and disposed anywhere appropriate for detecting a presence of a device to be charged (e.g., on, over, or near the charging device 220 or anywhere else where the sensor may have a good exposure to, for example, where the charging device 220 and the device to be charged may be located. The controller 202 may include or cooperate with other controller(s) discussed herein to determine one or more actions (e.g., related to opening or closing switches for electrical connections amongst various devices and/or transfer or distribution of electrical energy).

The vehicle (e.g., EV) described herein may be non-autonomous, fully autonomous, or semi-autonomous, while being at least partially (or fully) powered by electricity (e.g., via a motor-generator or the like) and including at least an energy storage device such as a battery. In that regard, the vehicle may be operated in an autonomous, semi-autonomous, or fully driver-operated state (operated independently of driver control and, from time to time, without a person inside of the vehicle) when, e.g., the vehicle is being moved to a location/position on, over, or near the charging device 220 so as to allow the charging or discharging of energy to occur.

Referring to FIG. 2, the controller 202 may include one or more processors or controllers which may be specifically designed and programmed for the system 200. The functions of the controller 202 (e.g., a dedicated controller for the system 200 or a plurality of controllers cooperating to perform one or more functions related to one or more components of the system 200) may be implemented in a single controller or in multiple controllers. The controller 202 may monitor (e.g., via one or more sensors monitoring the energy transfer and/or distribution) and/or control the system 200 to at least one of open or close one or more switches of the switching device 210 or monitor status of the energy transfer or distribution amongst various devices. Furthermore, the controller 202 may control the user interface 206 (e.g., an input device and/or an output device) to, e.g., display information related to the monitored status of the energy transfer or distribution.

The memory 204 may include any non-transitory memory and may store data usable by the controller 202. The memory 204 may be located within or on an apparatus including the controller 202 (e.g., within the building 100) and may be referred to as a local memory. In some embodiments, the memory 204 may be located remote from the apparatus including the controller 202 and may be referred to as a remote memory (e.g., as provided by a cloud service). The memory 204 may be a combination of the local memory and the remote memory in various embodiments. In some embodiments, the memory 204 may store data related to the energy transfer or distribution described herein. For example, the memory 204 may store data related to status of charging or discharging of energy (e.g., start or completion), when and how long a device was connected to a charging device 220 (e.g., for charging or discharging of energy), device profiles (including, e.g., voltage/current level for charging/discharging), etc. Furthermore, the memory 204 may store information retrieved from other sources including for example energy usage by one or more devices, cost of energy (e.g., at peak and off-peak energy usage hours from a utility company, etc.), etc. Such information may be retrieved by the system 200 and/or the controller 202 by for example the user interface 206 (i.e., user input entered by a user) and/or the network access device 208 (i.e., received via a wired or wireless communication from a third-party/remote device, e.g., associated with the utility company).

In some embodiments, the memory 204 may store additional information such as for example connected device identity and/or type, timestamp, time of week/month/year, and the stored information (including, e.g., daily departure/return time of a vehicle, SOC, charging lead-time, etc.) may be categorized or sorted by the connected device identity and/or type, time, etc. and/or utilized by the system 200 to "learn" the energy usage pattern of a home, a building, connected devices, etc. by employing, e.g., artificial intelligence or machine learning algorithm. For example, the stored information may be utilized by the system 200 to automate the energy transfer amongst the home, the building, the connected devices, etc., so as to achieve a goal such as, e.g., maximizing charge amount, minimizing utility cost (e.g., for the home or the building), or maximizing green energy sources. Such predetermined goals related to a threshold level of the charge amount, utility cost, or green energy sources may also be overridden by a user to change the energy usage/transfer plan as needed while considering additional factors such as, e.g., blackout frequency/duration, daily electrical load (demand), etc.

Moreover, based on the foregoing data retrieved and/or stored on the memory 204, the controller 202 may generate an energy distribution schedule to store on the memory 204. The energy distribution schedule may be based on information related to a plurality of devices including, e.g., the loads 218 and the energy storage devices 222—for example, an energy usage pattern, when and how long a device is connected to a charging device 220, etc. Information related to the electric grid 214, the renewable energy source 216, and/or the charging device 220 may also be utilized by the controller 202 to determine the energy distribution schedule. For example, the energy distribution schedule may be based on when the electric grid 214 may demand additional energy availability (e.g., during peak energy usage hours), a pricing rate schedule for electricity from a utility company, how much energy is generated by the renewable energy source 216 in a given duration of time, status of how many of the charging devices 220 are in use, etc.

For example, if there are certain electronic devices that are only used a couple of months per year (e.g., the snow blower 124B), the controller 202 may prioritize these devices lower than other devices that may be used more often (e.g., the vehicle 124A, the lawn mower 124C, the electric bicycle 124D, or the like) for scheduling when and how much energy distribution is to occur, while ensuring that these devices do not get completely depleted (e.g., by providing trickle charging). As but one example, if not maintained, the energy storage devices 222 may be damaged, too. Furthermore, some devices may be prioritized based on customer need and/or usage data. For example, the controller 202 may monitor energy availability (e.g., from the electric grid 214, the renewable energy source 216, the charging device 220 used to collect energy from various devices, the energy storage devices 222, etc.) and energy usage by the loads 218 throughout a given period of time (e.g., an hour, a day, a month, a year, etc.) and determine the energy distribution schedule which optimizes energy efficiency (i.e., an amount of idle energy is minimized and/or none of the loads 218 are depleted, etc.). Accordingly, a Home Energy Management System (HEMS) including, e.g., the energy distribution schedule may be generated, managed, and utilized.

In some embodiments, the various types of data stored on the memory 204 may be stored in various types of data structures and formats—the memory 204 may store a database, a data store, or the like.

Moreover, the system 200 may retrieve, determine, and/or store a demand response program schedule from a utility company (e.g., under dynamic pricing and related to varied energy pricing at different hours of day—peak and off-peak energy usage hours), actively learn various types of data (e.g., via Q-Learning—a model-free reinforcement learning algorithm or any other appropriate learning techniques to make optimal decisions on charging/discharging of various devices under the dynamic electricity prices and different energy consumption patterns), and optimize the energy distribution schedule (e.g., to reduce or minimize the cost of energy over a given period of time). In some embodiments, the algorithms and/or the energy distribution schedule may be user-configurable for various goals (including, e.g., minimizing cost of energy, maximizing use and storage of renewable/carbon neutral energy, maximizing income potential (e.g., by arbitrage during grid peak demand periods), a target level of SOC for various devices, maintaining a minimum level of SOC for various devices, and/or enabling an energy usage pattern without any interruption, maintaining storage for unplanned power outages due to blackouts and/or brownouts, optimization of battery life or longevity, meeting a plurality of predetermined user demand requirements, etc.). Moreover, the energy usage pattern may be learned by, e.g., artificial intelligence or machine learning algorithm utilizing the monitored data described herein as input.

As discussed herein, the user interface 206 and the network access device 208 may be utilized to communicate various types of data including user input. For example, the data store which may be stored, e.g., in the memory 204 can receive SOC information automatically (e.g., periodically or when a device is charged) or by user input, etc. (i.e., through the user interface 206 and/or the network access device 208). The SOC information can be tracked to learn patterns of energy usage, which can be utilized to determine an optimal and automated way to charge and/or distribute charge. That is, the system 200 may be capable of retrieving (e.g., wirelessly or via the user interface 206) data related to a device located on, over, or near the charging device 220 including, e.g., SOC (via cellular network, Bluetooth, Wi-Fi, RF (Radio Frequency) transmission, RFID (Radio Frequency Identification), GPS (Global Positioning System), a user device such as a mobile phone, etc.).

Furthermore, the user interface 206 may include an infotainment system of a vehicle configured to receive user input for requesting charging or discharging of energy from the vehicle or allowing sharing of vehicle information such as, e.g., SOC and/or a voltage/current level for the charging or discharging of energy. Moreover, in some embodiments, the user interface 206 may include a display (e.g., a touch screen) which may be utilized to show monetary transaction related to, e.g., the electric grid 214 receiving energy from the system 200. As discussed herein, a user may be compensated for offloading excess energy from his or her vehicle (i) automatically based on, e.g., a learned energy usage/transfer plan or pattern as described herein or (ii) by, e.g., sending a request via a mobile device software application program (or contacting a service provider or a third-party intermediary entity) to initiate an energy transfer from the vehicle to the electric grid 214, e.g., via the charging device 220.

The input device of the user interface 206 may include one or more input devices such as a button, a keyboard, a mouse, a touchscreen, a microphone, or the like. The input device may receive input from a user such as a driver of a vehicle or a resident of a home including the system 200. The input device may receive, for example, information corresponding to a request for transferring or distributing energy from one entity to another or for providing various types of information related to a vehicle or device to be charged or offload excess energy. In some embodiments, the input device may include additional input device(s) usable to control the system 200 by manually controlling one or more operations described herein.

Moreover, the input device may receive input from a user (e.g., a driver or a passenger of a fuel-efficient vehicle including a battery to be charged or to discharge energy). The input device may receive, for example, information corresponding to a request for charging or drawing charge from an energy storage device such as a battery of a vehicle. The request may include information such as a rate of charge/discharge (e.g., related to how fast to charge or discharge from the battery of the external device) and/or an amount of charge/discharge (e.g., 10%, 20%, 30%, 40%, 50%, 60%, 70%, 80%, 90%, 100%, etc. of the energy storage capacity) for the energy storage device of the vehicle. Further, the request may include information related to scheduling of the charging or discharging at a future date and/or time. The request may also include information related to a brand/maker of the vehicle to receive the charging or discharging, wherein the brand/maker may be a known brand/maker (i.e., with relevant information stored in the memory 204) allowing the system 200 automate one or more settings to provide the charging or discharging operation (e.g., a voltage/current level). Additional factors that may be utilized by the system 200 to automatically control the energy transfer schedule described herein may include charge/discharge voltage, current threshold, discharge rate, and SOC band, some or all of which may be utilized to ensure longevity of energy storage device such as battery, for example.

Moreover, the request may include information related to arbitraging excess energy from the vehicle to the electric grid 214 or purchasing or renting one or more batteries (e.g., the energy storage devices 222 of the system 200) which may be utilized for various purposes such as, e.g., extending a driving range of a vehicle, emergency roadside assistance, emergency back-up power, etc. That is, the system 200 may be available at a business site for loaning or selling the energy storage device(s) 222. Further, the request may also include information related to returning one or more batteries to be put back into the system 200. Additionally, the input device may accept various monetary payment methods as known in the art to receive payment for utilizing various services described herein (e.g., as made available from a business) including, e.g., charging a battery at a rate or by an amount higher than, respectively, a threshold rate or a threshold amount or purchasing or renting a battery pack.

The output device of the user interface 206 may include any output device such as a speaker, a display, a touchscreen, or the like. The output device may output data to a user of the system 200. The output device may, for example, output information relating to the SOC, a status of the electrical energy usage, transfer, or distribution, and/or the like. Moreover, the output device may output information corresponding to a menu for selecting the rate or amount of charge/discharge or purchasing, renting, or returning an energy storage device 222 discussed herein with reference to the input device. In some embodiments, the output device may provide information related to an amount of monetary compensation corresponding to an amount of energy discharged for arbitraging back to the electric grid 214. Further, the output device may include a display for displaying the details corresponding to the amount of compensation. For example, the monetary compensation/transaction may be based on credit or debit card or crypto-currency transaction.

In some embodiments, the user interface 206 may be a user interface device attached to or integrated with the apparatus including the controller 202. In some embodiments, the user interface 206 may be a user interface available on a remote device such as, e.g., a smartphone, a tablet, or the like which may be connected to the system 200 via wire or wirelessly. For example, the network access device 208 may be utilized to establish a wireless connection between the system 200 including the controller 202 and the remote device including the user interface 206. The wireless connection may be provided by any type of wireless connection known in the art such as for example Bluetooth, Wi-Fi, etc.

The network access device 208 may include any network access device capable of communicating via a communications protocol (e.g., a wireless protocol). For example, the network access device 208 may include a transceiver and communicate via Bluetooth, Wi-Fi, a cellular protocol, Zigbee, or any other communications (e.g., wireless) protocol. The network access device 208 may be referred to as a data communication module (DCM) and may communicate with any device or component included in the system 200 and/or any remote device.

In some embodiments, the system 200 may receive, via the network access device 208, SOC information of various devices (e.g., an EV) requesting charging or discharging of electrical energy. The SOC information may be received from a remote server receiving the requests from these devices and/or a remote user device (e.g., a smartphone, a tablet, or the like which may be used to run a software program application to share the SOC information with the system 200). Moreover, the SOC information may be received directly from a device or a vehicle which needs the electrical energy charging/discharging service. Such information can be utilized by the controller 202 and/or the system 200 to determine or plan an energy usage, storage, transfer, or distribution schedule that would optimize the energy usage, storage, transfer, and/or distribution such that, e.g., (i) an amount of energy that is left idly stored on the energy storage devices 222 and/or a length of such circumstance is minimized, (ii) an amount of money generated from arbitraging the excess energy to the electric grid 214 is maximized (while none of the loads 218 and/or devices utilizing energy are losing power at any given time), and/or (iii) energy cost to the facility including the system 200 is minimized. In some embodiments, such a planned energy usage, storage, transfer, or distribution schedule may be displayed by the output device of the user interface 206 for a user of the system 200 to visually confirm.

The switching device 210 may be configured to open and/or close one or more connections amongst the various devices connected through the connectors 212. In some embodiments, the switching device 210 may include a plurality of switches (e.g., of any type known in the art) which may be controlled (individually and/or in group) to open or close the connections as described herein (see also, e.g., a description of a configurable grid 410 with reference to FIG. 4). The switching device 210 may be connected or coupled to the controller 202 which may be configured to control the switching device 210 to open or close one or more of the plurality of switches, for example.

In some embodiments, depending on needs of individual devices that are connected to be charged or unload excess energy, the connections made be controlled such that, e.g., a single energy storage device 222 or more than one energy storage device (e.g., any combination of the plurality of energy storage devices 222), e.g., in any combination with the electric grid 214 and/or the renewable energy source 216 in some embodiments may be utilized to transfer or distribute energy, e.g., to one or more loads 218 including a vehicle to be charged or an appliance to be powered and/or the electric grid 214. For example, if a connected device such as an EV uses an amount of energy larger than a threshold amount or a rate of charge or discharge (e.g., based on voltage and/or current) higher than a threshold rate, more than one of the energy storage devices 222 may be used at once to charge (and/or receive electrical energy from) the vehicle. Furthermore, for a higher load capacity than a threshold load capacity, more than one of the energy storage devices 222 may be used. Additional energy from the electric grid 214 and/or the renewable energy source 216 may also be used as needed. As discussed herein, such configurability allows for a more efficient way to transfer or distribute electrical energy amongst a plurality of devices.

Additionally, the controller 202 may control at least one or more switches of the switching device 210 such that energy may be collected from, e.g., a device on, over, or near the charging device 220 (receiving the energy from the device) and/or the energy storage devices 222. The collected energy (e.g., of a user-configurable amount or a planned amount according to, e.g., an energy distribution schedule) may then be transferred/arbitraged back to the electric grid 214. In some embodiments, a user may receive monetary compensation in exchange. In some embodiments, the energy storage devices 222 may be reconfigurable and stackable, and the reconfigurable stack of the energy storage devices 222 disclosed herein may be used to accommodate a wide variety of charging/discharging needs by linking, combining, or separating power sources within the stack of the energy storage devices 222 and/or among two or more of such battery stacks.

The connectors 212 may be utilized by the system 200 for establishing connections amongst various devices and entities including, e.g., the electric grid 214, the renewable energy source 216, the loads 218, the charging device(s) 220, and/or the energy storage devices 222. The connectors 212 may include any type of connectors for these components as would be known to one of ordinary skill in the art, such as for example a contactor or a relay.

The electric grid 214, the renewable energy source 216, the load(s) 218, the charging device 220, and/or the energy storage devices 222 may be connected to one another (e.g., for receiving and/or providing electrical energy) via the connectors 212 and, in some examples, corresponding plugs of cables or wires extending from the one or more of the components. In some embodiments, the switching device 210 may be controlled to allow more than one connection to be made amongst these devices and entities simultaneously (for, e.g., receiving and/or providing electrical energy). Moreover, while not shown, one or more of these devices may include other types of device interfaces for input and/or output—such as for example AC outlets and USB (universal serial bus) outlets as well as DC input (e.g., from a solar or fuel cell energy source), AC input, etc.

The electric grid 214 may be a power grid of a utility company providing electricity to a given area. The electric grid 214 may be connected to the system 200 by one of the connectors 212, for example.

The renewable energy source 216 may include one or more of various types of energy sources discussed herein including, e.g., a solar panel, a windmill, a wind turbine, or the like, which may generate energy that is transferred through the switching device 210 under the control of the controller 202 to at least one of power one or more loads 218, charge the energy storage devices 222, or arbitrage any excess energy back to the electric grid 214.

The loads 218 may include any number of electronic devices such as for example the vehicle 124A, the snow blower 124B, the lawn mower 124C, the electric bicycle 124D, or any other appliance which may at least one of utilize or store electrical energy. In that regard, the energy storage devices 222 which may be charged with the energy received from various sources within the system 200 may also be considered a load 218.

The charging device 220 may be one or more charging devices. In some embodiments, the charging device 220 may be a wireless charging device such as for example a wireless charging device or pad. For example, the wireless charging device or pad may perform various methods of wireless charging. In some embodiments, an inductive charging may be employed—in this case, the system 200 may further include an additional mechanism for adjusting a position or orientation of the wireless charging pad. For example, the wireless charging pad may be raised from ground so as to minimize a distance between a wire coil of a power receiver and a wire coil of a power transmitter. In some embodiments, a magnetic resonant charging may be employed, allowing the distance between the wire coils of the power transmitter and the power receiver be, e.g., at or more than ten centimeters.

In some embodiments, the charging device 220 may include a wired charging device which may utilize a physical connection (e.g., by a cable or wire) for charging or discharging of energy.

The energy storage device 222 may be a battery. In some embodiments, the controller 202 may be connected to the plurality of energy storage devices 222, which may provide additional energy availability or temporary energy storage. The energy storage devices 222 may be removable and/or stackable as described herein and can provide charging capabilities, e.g., during peak or off-peak energy usage hours. Furthermore, the energy storage devices 222 may be used for powering the loads 218 and providing additional electricity back to the electric grid 214 during the peak energy usage hours. In this case, the vehicle (such as the vehicle 124A—an EV) does not necessarily need to be available to provide energy back to the electric grid 214— the energy storage devices 222 may serve as another source of energy to be transferred to the electric grid 214. In some embodiments, a user may receive monetary compensation for offloading excess energy back to the electric grid 214— whether from a V2G transfer with an EV on, over, or near the charging device 220 or from the energy storage devices 220 having additional energy availability.

In some embodiments, a user may request to offload excess energy from one or more sources (e.g., the vehicle or the energy storage device 220 in above scenarios) by using a mobile device software program application or contacting a service provider directly. In some embodiments, the request may be made through the user interface 206 of the system 200 which may be in data communication with, e.g., a utility company providing electrical energy service through the electric grid 214. Moreover, the user may share a current state of charge (SOC) of his or her fuel-efficient vehicle (e.g., EV) when requesting the above service so that the service provider may be prepared for how much energy is to be provided. In some embodiments, the user interface 206 (whether an output device on the apparatus including the controller 202 or a mobile device which may be in data communication with the controller 202) may include a display that may display the status of the energy transfer or distribution as well as that of a monetary transaction related to the compensation for the electrical energy that is arbitraged to the electric grid 214.

Further, in some embodiments, the system 200 may utilize a plurality of energy storage devices 222 which are stackable (e.g., stackable battery units) and provide many benefits and advantages such as efficiently receiving, storing, and/or delivering electrical energy in a user-configurable and versatile manner. The efficient receiving, storing, and/or delivering of the electrical energy includes, e.g., receiving and/or delivering the electrical energy from and/or to more than one device simultaneously.

Moreover, having these energy storage devices 222 is advantageous because the plurality of stackable energy storage devices 222 provide a way to add or remove one or more battery packs as needed for even more versatile way to transfer or distribute electrical energy for, e.g., powering one or more loads 218 at home or a business as well as any off-grid location.

With reference to the plurality of energy storage devices 222, while only one (1) block is illustrated in FIG. 2 (or four (4) blocks in FIG. 1), it would be apparent to one of ordinary skill in the art that the number of the energy storage devices 222 may vary. The energy storage devices 222 may be batteries of any type including for example a lithium-ion battery and contain individual battery units, each of which can be individually and independently charged and/or discharged. Moreover, the energy storage devices 222 may be grouped (logically or physically) into one or more groups of energy storage devices 222. In some embodiments, each battery or battery unit of the energy storage devices 222 may connect to a single device. In other embodiments, each group of the energy storage devices 222 (each group including one or more of the energy storage devices 222, for example) may connect to a single device. In further embodiments, each battery or battery unit (or each group of the energy storage devices 222) may connect to more than one device while, e.g., being balanced with respect to voltage and/or SOC, with each energy storage device 222 utilizing its own BMS (Battery Management System) to ensure the internal balancing. Moreover, before the energy storage devices 222 are grouped, the controller 202 may ensure that various energy storage devices 222 achieve a same voltage and SOC.

In some embodiments, the energy storage devices 222 may be stackable and removable from the system 200 and may be housed in corresponding receptacles (e.g., the receptacles 126) to which the energy storage devices 222 can be, e.g., clicked into (i.e., under tension). In some embodiments, the receptacles and/or the system 200 may include necessary ports, wiring, and/or connections for enabling the connections between the energy storage devices 222 and other devices or entities, such that the energy storage devices 222 and/or the receptacles may be easily removable from the system 200 without interrupting any functionality of the system 200 or any complicated disconnection and/or rewiring of the remaining energy storage devices 222. Thus, the energy storage devices 222 may be added to or removed from the system 200 as needed (e.g., additional energy storage devices may be added to the system 200 to increase available capacity and/or power of the system 200).

For example, the removability and transportability of the energy storage devices 222 may allow one or more of the energy storage devices 222 to be repurposed or refurbished as, e.g., a mobile range extender or a portable power station (e.g., on demand). Moreover, one or more of the energy storage devices 222 removed from the system 200 may be used to connect (e.g., directly) to a DC-to-DC boost converter of a hybrid or electric vehicle (e.g., supplying energy to a main battery of the vehicle while the vehicle is being driven). Furthermore, any unused (e.g., fully or partially) energy storage device 222 may be collected from a user's vehicle and added to the system 200 and provide the additional energy availability or capabilities for various purposes as described herein.

In some embodiments, the energy storage devices 222 may be ergonomically sized and handled such that the energy storage devices 222 may be easily removable and/or transportable, thus allowing the energy storage devices 222 to be easily repurposed and/or exchanged between the system 200 and a vehicle, for example. In some embodiments, the energy storage devices 222 removed from the system 200 may be stored in a front trunk ("frunk"), a truck bed or deck, a trailer, and/or the like of an electric or hybrid vehicle to function as a range extender, and any unused energy storage device 222 from the electric or hybrid vehicle may be collected from the frunk, the truck bed or deck, the trailer, and/or the like. The energy storage devices 222 (and the corresponding receptacle(s) in some examples) may be stackable within the electric or hybrid vehicle, too, when functioning as a range extender. In some embodiments, the energy storage device 222 with an integrated CPU (central processing unit) (not shown) can function as a power station, a UPS (uninterruptible power supply), or an anergy storage device for renewable energy generators (such as solar panels, etc.). For example, the solar panels may connect directly to the DC input terminals and utilize the solar controller.

Furthermore, the energy storage devices 222 may store electrical energy and include one or more energy storage devices including a battery, a super capacitor, or the like.

As briefly discussed in other sections of the present disclosure, the system 200 may also include one or more sensors (not shown). The one or more sensors may include any sensor capable of detecting data corresponding to a location of a device to be charged or offload excess energy— the sensor may be an image sensor including a camera, a RADAR sensor, a LIDAR sensor, or the like, a weight sensor, a proximity sensor (e.g., a Near-Field Communication (NFC), Bluetooth, and/or Wi-Fi device, and/or other proximity sensors of inductive, optical, capacitive, magnetic, infrared, and ultrasonic types), etc. The sensors may also include one or more sensors capable of detecting a status of a vehicle component. For example, the sensors may include a voltage sensor, a current sensor, a power sensor, an SOC sensor, and/or the like communicatively coupled to the controller 202 (e.g., via the network access device 208). In one example, these sensors may detect data related to an SOC of a vehicle which may be utilized by, e.g., the system 200 and/or the controller 202 to make various determinations related to, e.g., an intelligently planned energy transfer or distribution schedule to receive and/or provide electrical energy as described in more detail throughout the present disclosure. In some embodiments, these sensors may be on or within the vehicle or device to be charged or offload excess energy.

Figure 3:
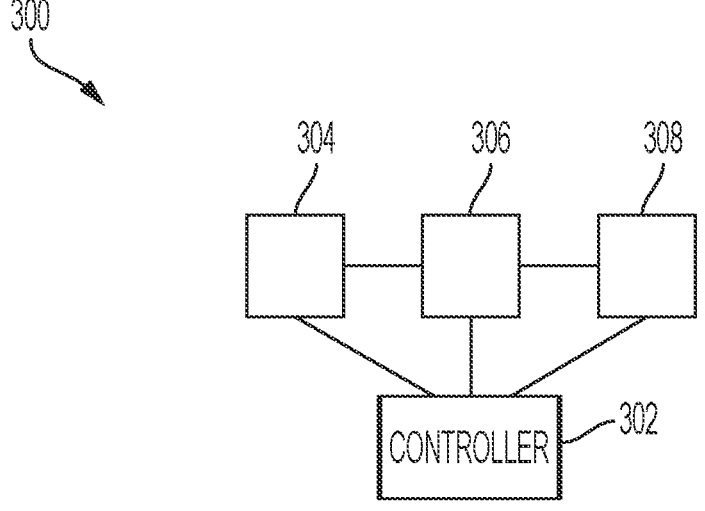
FIG. 3 is a block diagram of an example charging device utilized by a system for managing transfer or distribution of electrical energy amongst a plurality of devices according to an embodiment of the present invention.

FIG. 3 is a block diagram of an example charging device 300 (e.g., the charging device 220) utilized by a system (e.g., system 200) for managing transfer or distribution of electrical energy amongst a plurality of devices. The charging device 300 may include a controller 302, a bi-directional AC/DC converter 304, and a bi-directional DC/DC converter 306 configured to connect to an energy storage device 308. In some embodiments, the charging device 300 may be connected to a renewable energy source (e.g., the renewable energy source 216) and/or an electric grid (e.g., the electric grid 214). The electric grid may provide energy to a plurality of loads (e.g., the loads 218) connected to it. In some embodiments, the charging device 300 may be found in an EV or any other electronic device capable of providing and/or utilizing the bi-directional energy transfer.

When charging, the bi-directional AC/DC converter 304 may convert an AC power (e.g., received from the electric grid) to DC for the energy storage device 308. When discharging, the DC battery power may be converted to AC power and transferred back, e.g., to the electric grid or a load device.

Figure 4:
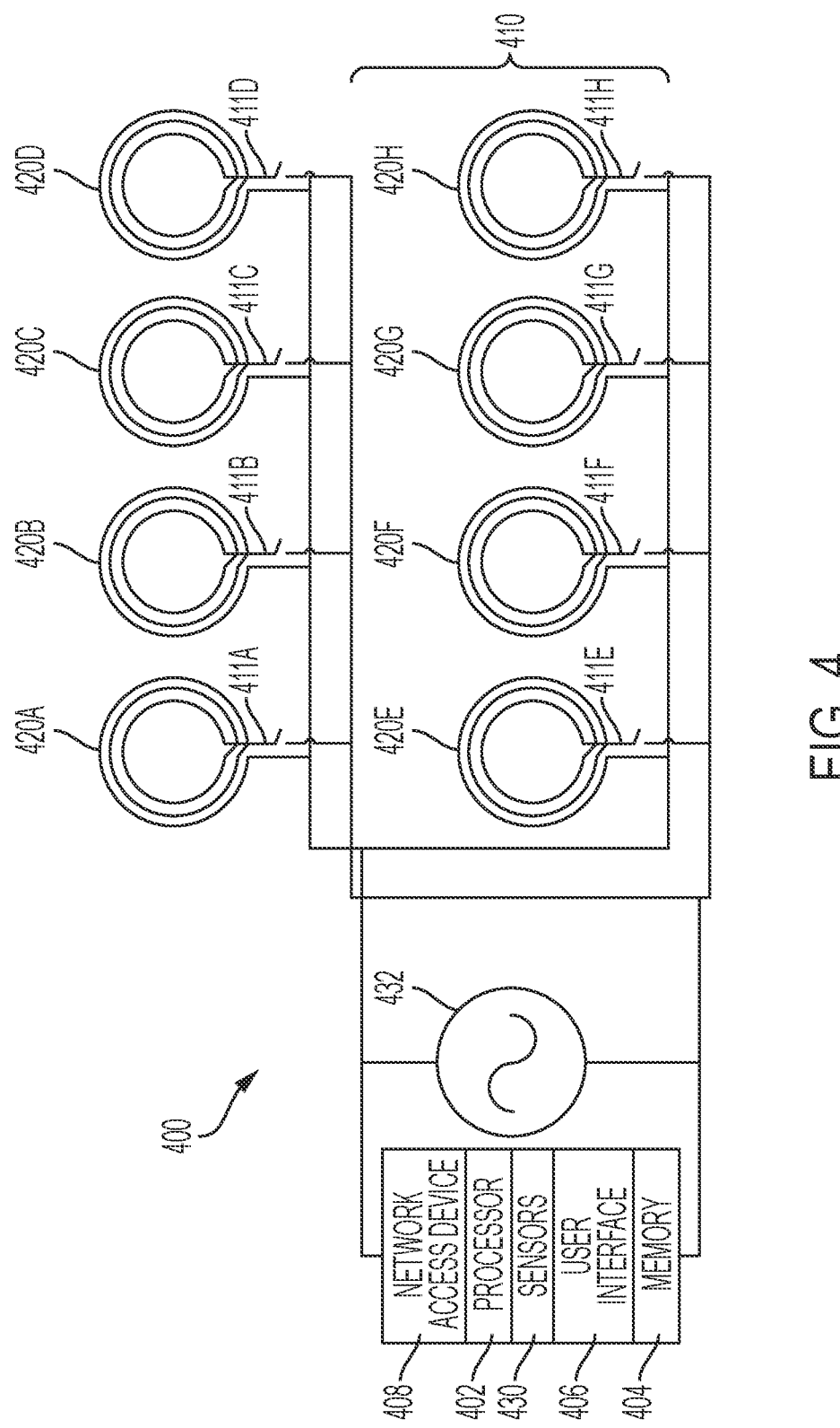
FIG. 4 is an illustration of an example wireless charging system utilized by a system for managing transfer or distribution of electrical energy amongst a plurality of devices according to an embodiment of the present invention.

FIG. 4 is an illustration of an example wireless charging system 400 utilized by a system (e.g., the system 200) for managing transfer or distribution of electrical energy amongst a plurality of devices. The wireless charging system 400 (also may be referred to as a wireless charging device or apparatus) may be included within, connected to, or a part of a system (e.g., the system 200) for managing transfer or distribution of electrical energy amongst a plurality of devices, which utilizes, e.g., a wireless charging pad. The wireless charging system 400 may transmit a wireless charging signal, such as an alternating magnetic field, that, when received by or is within a proximity of one or more inductive loops of a vehicle or device, may cause the inductive loop to generate electrical energy to be stored in one or more energy storage devices such as batteries of the vehicle or device and/or used to power the vehicle or device.

The wireless charging system 400 may include a processor 402, a memory 404, a power source 432, and a configurable grid 410. The configurable grid 410 may include one or more inductive coils 420A-H and one or more switches 411A-H. In some embodiments, there may be one coil larger than others (e.g., for a vehicle) and differently sized coils for different levels of energy transfer needs. In some embodiments, the multiple coils (e.g., of different sizes) may be disposed on a single pad. Moreover, in some embodiments, there may be individual pads with individual circuits/coils for devices based on power need. The wireless charging system 400 may also include a user interface 406, a network access device 408 and/or one or more sensors 430. In various embodiments, the processor 402, the memory 404, the user interface 406, and the network access device 408 may be the same as, a part of, or separate from but connected to, respectively, the controller 202, the memory 204, the user interface 206, and the network access device 208 of the system 200 described herein with reference to FIG. 2.

The wireless charging system 400 may include one or more computing devices, such as the processor 402. The processor 402 may be a controller, a microprocessor, or other control device that executes or performs operations stored in the memory 404. The processor 402 may be remote or local to a charging station (e.g., the charging device 220 or the system 200). The processor 402 may be configured to control various components including the network access device 408, the one or more sensors 430, the one or more switches 411A-H, the power source 432, and/or the one or more inductive coils 420A-H to detect a vehicle or device to be charged on, over, or near a wireless charging pad (e.g., the charging device 220), activate or deactivate power to the one or more inductive coils 420A-H to charge the vehicle or device, etc.

The following are examples of different forms of control the processor 402 may employ. The processor 402 may communicate with a payment center using the network access device 408 to communicate through a network to accept, verify, and/or otherwise process payment information. The processor 402 may open or close the one or more switches 411A-H, e.g., to form a closed circuit to activate or deactivate one or more of the inductive coils 420A-H.

The memory 404 may be coupled to the processor 402. The memory 404 may store instructions to be executed by the processor 402 and may include one or more of a RAM (Random Access Memory) or other volatile or non-volatile memory. The memory 404 may be a non-transitory memory or a data storage device, such as a hard disk drive, a solid-state disk drive, a hybrid disk drive, or other appropriate data storage, and may further store machine-readable instructions, which may be loaded and executed by the processor 402.

The power source 432 may provide an alternating current through the configurable grid 410 to emit through the one or more inductive coils 420A-H. The alternating current through the one or more inductive coils 420A-H may generate a magnetic field that is transmitted or emanated by the one or more inductive coils 420A-H. When an inductive loop of a vehicle or device to be charged is within a threshold distance of the one or more inductive coils 420A-H, the magnetic field may generate current within the inductive loop of the vehicle or device. The generated current may then be converted into a direct current which may charge or power the vehicle or device.

The configurable grid 410 may include one or more inductive coils 420A-H and one or more switches 411A-H. In some embodiments, the configurable grid 410 may have one or more layers of inductive coils. The configurable grid 410 may have one or more inductive coils in each of the one or more layers—for example, the configurable grid 410 may have a first plurality of inductive coils in a first layer and a second plurality of inductive coils in a second layer, etc. The configurable grid 410 may have any number of inductive coils in any number of layers of inductive coils. Each inductive coil of the one or more inductive coils 420A-H may have any number of turns, such as 3 turns, 5 turns, or 10 turns, of wire. Each inductive coil may be connected to a switch such as a switch of the one or more switches 411A-H.

The one or more inductive coils 420A-H may be made from electrically conductive wire. The one or more inductive coils 420A-H may be positioned at various different locations of the configurable grid 410. By having multiple inductive coils 420A-H in the various different positions that are activated, an area covered by the multiple inductive coils 420A-H that are activated compensate for any mis-alignment between the multiple inductive coils 420A-H and the inductive loops of the vehicle or device to be charged. The multiple inductive coils 420A-H provide a greater likelihood of aligning and/or positioning the inductive coils 420A-H in alignment with the one or more inductive loops of the vehicle or device than, e.g., a single coil. As described herein, in some embodiments, there may be one coil larger than others (e.g., for a vehicle) and differently sized coils for different levels of energy transfer needs. In some embodiments, the multiple coils (e.g., of different sizes) may be disposed on a single pad. Moreover, in some embodiments, there may be individual pads with individual circuits for devices based on power need.

The one or more switches 411A-H may each be in an open position or a closed position to, e.g., form a closed circuit with one or more inductive coils 420A-H within the configurable grid 410. The processor 402 may control the one or more switches 411A-H and move the one or more switches 411A-H into the open position or the closed position to form the closed circuit that selectively activates an inductive coil to charge the inductive loops of the vehicle or device disposed on, over, or near the one or more inductive coils 420A-H of the wireless charging system 400.

The one or more sensors 430 may include a charging sensor, a proximity sensor, an alignment sensor, and/or an image sensor such as a camera. In some embodiments, the one or more sensors 430 may include a charging sensor for each of the one or more inductive coils 420A-H. The charging sensor may measure an efficiency factor for each of the one or more inductive coils 420A-H. For example, the charging sensor may detect that an inductive loop of the vehicle or device being charged may be generating an electrical charge from the magnetic field of the inductive coil 420A, e.g., at approximately 33% efficiency, whereas a different inductive loop of the vehicle or device being charged may be generating an electrical charge from the magnetic field of the inductive coil 420C, e.g., at approximately 80% efficiency (i.e., at a higher level of efficiency than that of the inductive coil 420A). Accordingly, the wireless charging system 400 may determine that the inductive coil 420C is more efficient than the inductive coil 420A and activate the inductive coil 420C. In some embodiments, regarding efficiency of a coil, coupling factor and efficiency may be calculated based on charging rate.

The proximity sensor may measure or detect a distance from the wireless charging pad to the vehicle or device being charged. The wireless charging system 400 may use the measured or detected distance to activate when the vehicle or device being charged is within a threshold distance of the wireless charging pad.

The alignment sensor and/or the image sensor (e.g., a camera, a RADAR sensor, a LIDAR sensor, or the like) may be used to align the one or more inductive coils 420A-H with the one or more inductive loops of the vehicle or device being charged. The alignment sensor may be a target sensor that signals when the target sensor is aligned with an optical sensor on the vehicle or device. When the alignment and the target sensors are aligned, the efficiency of energy transfer and generation of electrical energy for storage in the vehicle or device being charged may be at its maximum or peak, e.g., with approximately 80-90% efficiency. The alignment sensor may provide an indication of a direction to move the vehicle or device being charged and/or navigate the vehicle or device to align the alignment sensor with the target sensor. For example, the wireless charging system 400 may display on the user interface 406 a direction to move the vehicle or device to align the inductive coils 420A-H with the one or more inductive loops of the vehicle or device based on information obtained using the alignment sensor. In some embodiments, the wireless charging pad may be labeled or marked and/or include, e.g., one or more magnets to indicate or cause the device to be charged (i.e., the inductive loops of the device) to be aligned with the inductive coils 420A-H such that the charging efficiency is maximized—over at least a threshold efficiency.

The image sensor may include a camera configured to capture an image or a video of an underside of the vehicle or device being charged and indicate to a driver or user and/or navigate the vehicle or device to align the one or more inductive coils 420A-H with the inductive loops of the vehicle or device. The wireless charging system 400 may display on the user interface 406 the direction to move the vehicle or device to align the inductive coils 420A-H with the one or more inductive loops based on the image or the video from the camera.

The user interface 406 may be positioned on and/or connected to the wireless charging pad. The user interface 406 may provide an interface for input and/or output. The user interface 406 may have user elements. The user interface 406 may receive user input such as a selection of user elements to obtain one or more configuration settings that position and/or activate the one or more inductive coils 420A-H, for example. The output may include notifications and/or alerts indicating the initialization or use of the wireless charging system 400 and/or the positioning of the one or more inductive coils 420A-H relative to the one or more inductive loops of the vehicle or device. In some embodiments, the user interface 406 may be part of or connected to the vehicle or device being charged.

The network access device 408 may include a communication port or channel, such as one or more of a Wi-Fi unit, a Bluetooth unit, an RFID tag or reader, or a cellular network unit for accessing a cellular network (such as a 3GPP 4G or 5G network, or the like). The network access device 408 may transmit data to and receive data from devices and systems not directly connected to the wireless charging pad, for example.

The wireless charging system 400 may enable an automated and contact-free charging or discharging operation (due to the wireless nature of charging/discharging and/or communication), thus avoiding any potential damage to the vehicle or device, for example.

In various embodiments, the wireless charging pad may be a single pad or more than one pad placed apart from each other so as to accommodate multiple devices. In the single pad, the pad may be marked with locations that are useful for identifying where, e.g., a best coupling (i.e., a highest efficiency) may be achieved between the inductive loops of the vehicle or device being charged and the inducive coils 420A-H.

In some embodiments, the wireless charging pads may be customized to a specific vehicle or device being charged (e.g., as rated to a charge rate, a voltage/current level, a target SOC level, a type of device, etc.), which utilizes less communications (than without the customization) with the vehicle or device being charged and thus may be less costly in terms of, e.g., memory and/or resource usage. In some embodiments, a controller (e.g., the controller 202 and/or the controller 402) may step up or down voltage and/or frequency for the charging/discharging operation as needed, e.g., when the wireless charging pad is not customized to any specific vehicle or device.

FIG. 5 is a flowchart illustrating a method 500 for managing transfer or distribution of electrical energy amongst a plurality of devices. The method 500 includes generating or receiving energy storage or usage data associated with at least one of the plurality of devices (step 502); receiving, from a first device, first data indicative of a request to receive energy (step 504); receiving, from a second device, second data indicative of a request to unload energy (step 506); determining, based on the energy storage or usage data, the first data, and the second data, an energy distribution schedule (step 508); and controlling, via a controller, a switching device configured to open or close one or more connections to the plurality of devices to provide or collect energy to or from at least the first and the second devices according to the energy distribution schedule (step 510).

In some embodiments, the generating of the energy storage or usage data in step 502 may include monitoring at least one of a time of day or a duration of time associated with an energy usage by each of the at least one of the plurality of devices. Moreover, in further embodiments, the generating of the energy storage or usage data may include monitoring at least one of a time of day or a duration of time associated with an energy transfer or distribution to or from each of the at least one of the plurality of devices.

In some embodiments, the controlling of the switching device in step 510 may include controlling the switching device such that a predetermined amount of energy from a third device is collected by a wireless charging device and the collected energy is distributed to an electric grid connected to the switching device. In further embodiments, the controlling of the switching device may include controlling the switching device such that a predetermined amount of energy from a third device is collected by a wireless charging device and the collected energy is automatically distributed to an electric grid or a fourth device connected to the switching device according to the energy distribution schedule.

In some embodiments, the method 500 may further include storing energy in an energy storage device connected to the switching device, wherein the controlling of the switching device may include controlling the switching device such that a predetermined amount of the energy stored in the energy storage device is distributed to an electric grid connected to the switching device.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments (e.g., including a singular element where multiple elements are described and/or multiple elements where a singular element is described, etc.) that reasonably fall within the scope of the advancement to the art hereby contributed, and that that scope shall not be restricted, except in light of the appended claims and their equivalents.

What is claimed is:

1. A system for managing transfer or distribution of electrical energy amongst a first vehicle and a household device, the system comprising:
   a first wireless charging pad configured to charge the first vehicle;
   a second wireless charging pad configured to charge the household device, the second wireless charging pad being spaced apart from the first wireless charging pad;
   one or more connectors configured to provide one or more connections to the first wireless charging pad and the second wireless charging pad;
   a switching device connected to the one or more connectors and configured to open or close the one or more connections; and a controller coupled to the first wireless charging pad, the second wireless charging pad, and the switching device and configured to:

monitor at least one of a time of day or a duration of time associated with an energy transfer or distribution to or from the first vehicle via the first wireless charging pad and a time of day, a time of year, and a duration of time associated with an energy transfer or distribution to or from the household device via the second wireless charging pad to generate energy storage or usage data;

determine an energy distribution schedule to minimize idle energy or avoid depleting the first vehicle or the household device based on the energy storage or usage data; and control the switching device to provide or collect energy to or from at least the first vehicle and the household device according to the energy distribution schedule.

2. The system of claim 1, wherein the one or more connectors are configured to connect to at least one of an electric grid, one or more renewable energy source apparatus, one or more electrical load devices including a plurality of appliances, one or more wireless charging pads, or one or more energy storage devices.

3. The system of claim 2, wherein the one or more connectors are configured to connect to the one or more energy storage devices; and wherein the one or more energy storage devices include one or more stackable energy storage devices.

4. The system of claim 2, wherein the first wireless charging pad and the second wireless charging pad are configured to provide wireless charging by electromagnetic inductive charging or magnetic resonant charging.

5. The system of claim 1, wherein the energy storage or usage data include data indicative of a device being charged or expending energy at least a threshold frequency of times per a prescribed period of time.

6. The system of claim 1, wherein the energy storage or usage data include data indicative of a device being charged or expending energy less than a threshold frequency of times per a prescribed period of time.

7. The system of claim 6, wherein the controller is further configured to control the switching device to provide trickle charging to the first vehicle or the household device being charged or expending energy less than the threshold frequency of times per the prescribed period of time.

8. A control apparatus for managing transfer or distribution of electrical energy amongst a first vehicle and a household device, the control apparatus comprising:

a first wireless charging pad configured to charge the first vehicle;

a second wireless charging pad configured to charge the household device, the second wireless charging pad being spaced apart from the first wireless charging pad;

one or more connectors configured to provide one or more connections to the first wireless charging pad and the second wireless charging pad;

a switching device connected to the one or more connectors and configured to open or close the one or more connections; and a controller coupled to the first wireless charging pad, the second wireless charging pad, and the switching device and configured to:

monitor at least one of a time of day or a duration of time associated with an energy transfer or distribution to or from the first vehicle via the first wireless charging pad and a time of day, a time of year, and a duration of time associated with an energy transfer or distribution to or from the household device via the second wireless charging pad to generate energy storage or usage data;

determine an energy distribution schedule to minimize idle energy or avoid depleting the first vehicle or the household device based on the energy storage or usage data; and control the switching device to provide or collect energy to or from at least the first vehicle and the household device according to the energy distribution schedule.

9. The control apparatus of claim 8, wherein the one or more connectors are configured to connect to at least one of an electric grid, one or more renewable energy source apparatus, one or more electrical load devices including a plurality of appliances, one or more wireless charging pads, or one or more energy storage devices.

10. The control apparatus of claim 9, wherein the first wireless charging pad and the second wireless charging pad are configured to provide bi-directional charging.

11. The control apparatus of claim 9, wherein:

the one or more connectors are configured to connect to at least the electric grid;

the first wireless charging pad and the second wireless charging pad are configured to provide bi-directional charging; and the controller is further configured to control the switching device to receive energy from the first wireless charging pad and the second wireless charging pad and provide the received energy to the electric grid.

12. The control apparatus of claim 9, wherein:

the one or more connectors are configured to connect to at least the one or more electrical load devices and the first wireless charging pad and the second wireless charging pad;

the first wireless charging pad and the second wireless charging pad are configured to provide bi-directional charging; and the controller is further configured to control the switching device to receive energy from the first wireless charging pad and the second wireless charging pad and provide the received energy to at least one of the one or more electrical load devices.

13. The control apparatus of claim 12, wherein:

the controller is further configured to control the switching device to receive the energy from the first wireless charging pad and the second wireless charging pad before a predetermined time of day and provide the received energy to the at least one of the one or more electrical load devices after the predetermined time of day.

14. The control apparatus of claim 9, wherein:

the one or more connectors are configured to connect to at least the first wireless charging pad and the second wireless charging pad and the one or more energy storage devices;

the first wireless charging pad and the second wireless charging pad are configured to provide bi-directional charging;

the one or more energy storage devices include one or more stackable energy storage devices; and the controller is further configured to control the switching device to receive energy from the first wireless charging pad and the second wireless charging pad and utilize the received energy to charge at least one of the one or more stackable energy storage devices.

15. A method for managing transfer or distribution of electrical energy amongst a first vehicle and a household device, the method comprising:

monitoring at least one of a time of day or a duration of time associated with an energy transfer or distribution to or from the first vehicle via the first wireless charging pad and a time of day, a time of year, and a duration of time associated with an energy transfer or distribution to or from the household device via a second wireless charging pad to generate energy storage or usage data, the second wireless charging pad being spaced apart from the first wireless charging pad;

determining an energy distribution schedule to minimize idle energy or avoid depleting the first vehicle or the household device based on the energy storage or usage data; and controlling, via a controller, a switching device configured to open or close one or more connections to the first vehicle and the household device to provide or collect energy to or from at least the first vehicle and the household device according to the energy distribution schedule.

16. The method of claim 15, wherein the energy storage or usage data include data indicative of a device being charged or expending energy at least a threshold frequency of times per a prescribed period of time.

17. The method of claim 15, wherein the energy storage or usage data include data indicative of a device being charged or expending energy less than a threshold frequency of times per a prescribed period of time.

18. The method of claim 15, wherein the controlling the switching device includes controlling the switching device such that a predetermined amount of energy from a first device is collected by a wireless charging device and the collected energy is distributed to an electric grid connected to the switching device.

19. The method of claim 15, wherein the controlling the switching device includes controlling the switching device such that a predetermined amount of energy from a first device is collected by a wireless charging device and the collected energy is automatically distributed to an electric grid or a second device connected to the switching device according to the energy distribution schedule.

20. The method of claim 15, wherein the energy distribution schedule is user-configurable and configured for achieving at least one of reduced cost of energy, increased use and storage of renewable or carbon neutral energy, increased monetary income for a user, a target level of state of charge (SOC) for the at least one of the first vehicle and the household device, maintaining a minimum level of SOC for the at least one of the first vehicle and the household device, enabling an energy usage pattern without any power interruption, or meeting a plurality of predetermined user energy demand requirements.

* * * * *